United States Patent
Hasegawa et al.

(10) Patent No.: US 10,120,612 B2
(45) Date of Patent: Nov. 6, 2018

(54) APPARATUS, METHOD, AND PROGRAM PRODUCT FOR TAPE COPYING

(71) Applicant: International Business Machines Corporation, Armonk, NY (US)

(72) Inventors: Tohru Hasegawa, Tokyo (JP); Hiroshi Itagaki, Tokyo (JP); Sosuke Matsui, Tokyo (JP); Shinsuke Mitsuma, Tokyo (JP); Tsuyoshi Miyamura, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/402,589

(22) Filed: Jan. 10, 2017

(65) Prior Publication Data

US 2018/0196607 A1 Jul. 12, 2018

(51) Int. Cl.
| | |
|---|---|
| G06F 3/06 | (2006.01) |
| G06F 7/36 | (2006.01) |
| G11B 27/00 | (2006.01) |
| G11B 27/10 | (2006.01) |
| G11B 5/86 | (2006.01) |

(52) U.S. Cl.
CPC ............ *G06F 3/065* (2013.01); *G06F 3/0619* (2013.01); *G06F 3/0686* (2013.01); *G06F 7/36* (2013.01); *G11B 27/10* (2013.01); *G11B 5/86* (2013.01)

(58) Field of Classification Search
None
See application file for complete search history.

(56) References Cited

U.S. PATENT DOCUMENTS 4,321,670 A * 3/1982 Timmons ................. G06F 7/32
8,400,897 B2    3/2013 Itagaki et al.
(Continued)

FOREIGN PATENT DOCUMENTS

JP    2012065087    3/2012
JP    2014081988    5/2014
(Continued)

OTHER PUBLICATIONS

"Linear Tape File System (LTFS) Format Specification", SNIA Advancing Storage and Information Technology, http://www.snia.org/tech_activities/standards/curr_standards/ltfs, Apr. 2016, 2 pages.
(Continued)

*Primary Examiner* — Kaushikkumar Patel
(74) *Attorney, Agent, or Firm* — Kunzler, PC

(57) ABSTRACT

An apparatus, method, system, and program product are disclosed for tape copying. One method includes mounting a first source tape of multiple source tapes on a source tape drive. The method includes mounting a destination tape on a destination tape drive. The method also includes copying a first index of an index partition of the first source tape to a first copied index of an index partition of the destination tape. The method includes storing first position information corresponding to the first copied index on the destination tape. The method also includes copying first data of a data partition of the first source tape to a first copied data of a data partition of the destination tape. The method includes storing second position information corresponding to the first copied data on the destination tape.

17 Claims, 14 Drawing Sheets

(56) References Cited

U.S. PATENT DOCUMENTS

| | | |
|---|---|---|
| 9,058,844 B2 | 6/2015 | Ballard |
| 9,208,818 B1 | 12/2015 | Freitag et al. |
| 2011/0238716 A1* | 9/2011 | Amir .................... G06F 3/0611 707/823 |
| 2013/0148227 A1* | 6/2013 | Tofano ................. G06F 3/0608 360/48 |
| 2013/0271865 A1* | 10/2013 | Amir ................. G11B 5/00826 360/15 |
| 2014/0330817 A1* | 11/2014 | Eleftheriou ........... G06F 3/0611 707/722 |
| 2014/0379980 A1* | 12/2014 | Hasegawa ............... G06F 3/065 711/111 |
| 2015/0062733 A1* | 3/2015 | Ashida ................. G06F 3/0613 360/39 |
| 2015/0149415 A1* | 5/2015 | Iwanaga ............. G06F 11/1469 707/684 |
| 2015/0170708 A1* | 6/2015 | Berman ............... G11B 23/037 242/337 |
| 2015/0363119 A1* | 12/2015 | Itagaki .................. G06F 3/0613 711/111 |
| 2017/0168741 A1* | 6/2017 | Carter ..................... G06F 11/00 |
| 2017/0315756 A1* | 11/2017 | Malina .................. G06F 3/0664 |

FOREIGN PATENT DOCUMENTS

| | | |
|---|---|---|
| JP | 2014215668 | 11/2014 |
| JP | 2015005229 | 1/2015 |
| JP | 2015088199 | 5/2015 |
| JP | 2015090655 | 5/2015 |
| JP | 2015204125 | 11/2015 |
| JP | 2015215788 | 12/2015 |

OTHER PUBLICATIONS

"Extended Copy Command", Working Draft SCSI Extended Copy Command, Apr. 2, 1999, 34 pages.

* cited by examiner

APPARATUS, METHOD, AND PROGRAM PRODUCT FOR TAPE COPYING

FIELD

The subject matter disclosed herein relates to accessing data on tapes and more particularly relates to tape copying.

BACKGROUND

Data replication or data backups may be used to replicate data such that a backup of the data is maintained to aid in data recovery. Data may be stored on tapes.

BRIEF SUMMARY

An apparatus for tape copying is disclosed. A method and computer program product also perform the functions of the apparatus. In one embodiment, an apparatus includes a mounting module that mounts a first source tape of multiple source tapes on a source tape drive and mounts a destination tape on a destination tape drive. The apparatus, in a further embodiment, includes a duplication module that copies a first index of an index partition of the first source tape to a first copied index of an index partition of the destination tape and copies first data of a data partition of the first source tape to a first copied data of a data partition of the destination tape. In various embodiments, the apparatus includes a positioning module that stores first position information corresponding to the first copied index on the destination tape and stores second position information corresponding to the first copied data on the destination tape. In certain embodiments, at least a portion of the mounting module, the duplication module, and the positioning module includes one or more of hardware and executable code. The executable code may be stored on one or more computer readable storage media.

A method for tape copying, in one embodiment, includes mounting a first source tape of multiple source tapes on a source tape drive. In various embodiments, the method includes mounting a destination tape on a destination tape drive. The method may also include copying a first index of an index partition of the first source tape to a first copied index of an index partition of the destination tape. The method includes, in one embodiment, storing first position information corresponding to the first copied index on the destination tape. The method may also include copying first data of a data partition of the first source tape to a first copied data of a data partition of the destination tape. In certain embodiments, the method includes storing second position information corresponding to the first copied data on the destination tape.

In one embodiment, a computer program product for tape copying includes a computer readable storage medium having program instructions embodied therewith. The program instructions, in some embodiments, are executable by a processor to cause the processor to mount a first source tape of multiple source tapes on a source tape drive. The program instructions, in one embodiment, are executable by a processor to cause the processor to mount a destination tape on a destination tape drive. In a further embodiment, the program instructions are executable by a processor to cause the processor to copy a first index of an index partition of the first source tape to a first copied index of an index partition of the destination tape. In certain embodiments, the program instructions are executable by a processor to cause the processor to store first position information corresponding to the first copied index on the destination tape. The program instructions, in various embodiments, are executable by a processor to cause the processor to copy first data of a data partition of the first source tape to a first copied data of a data partition of the destination tape. In some embodiments, the program instructions are executable by a processor to cause the processor to store second position information corresponding to the first copied data on the destination tape.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
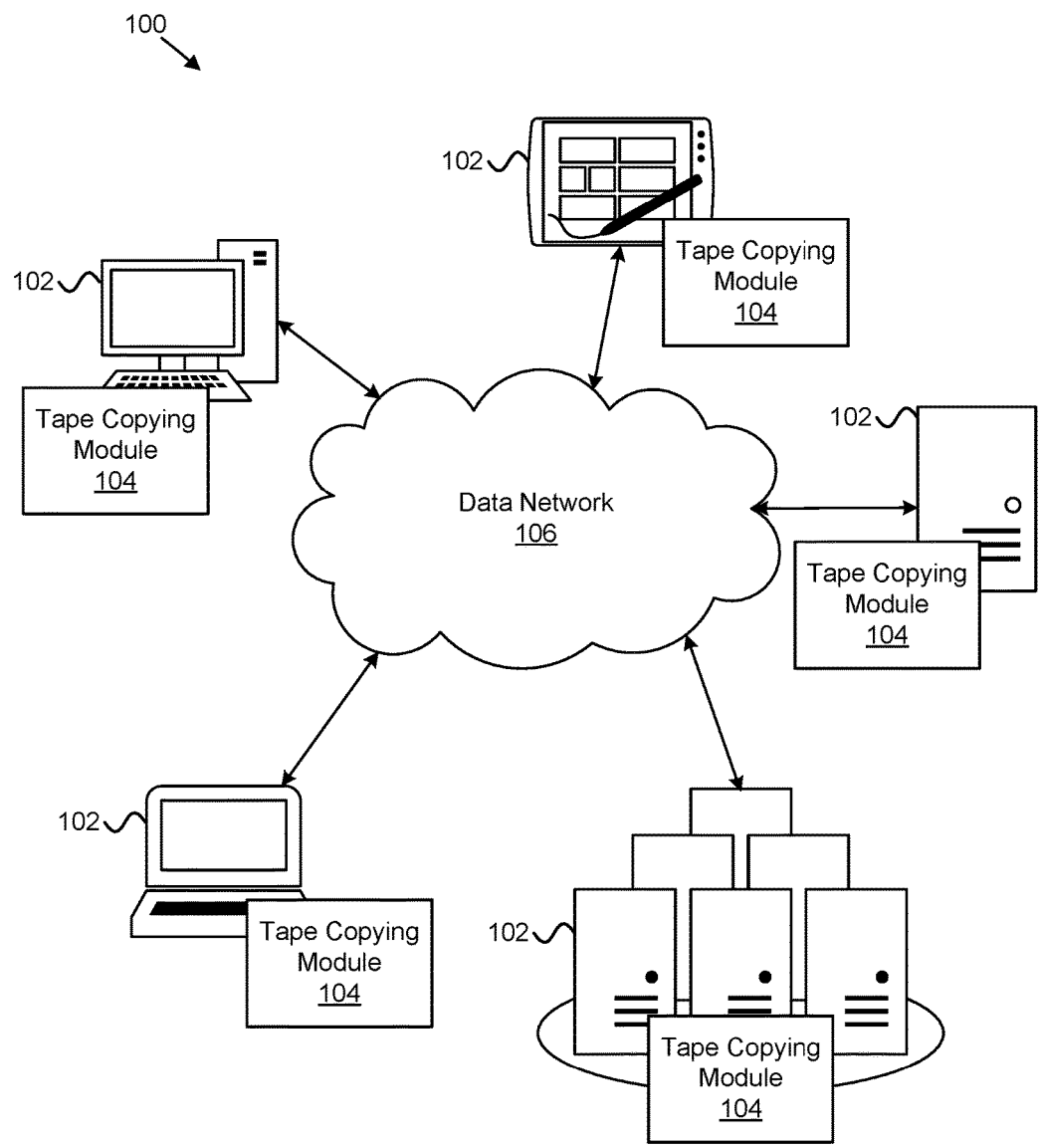
FIG. 1 is a schematic block diagram illustrating one embodiment of a system for tape copying in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for tape copying. In one embodiment, the system 100 includes information handling devices 102, tape copying modules 104, and data networks 106. Even though a particular number of information handling devices 102, tape copying modules 104, and data networks 106 are depicted in the system 100 of FIG. 1, one of skill in the art will recognize that any number or configuration of information handling devices 102, tape copying modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, tape readers, or the like. In some embodiments, the information handling devices 102 are in communication via one or more data networks 106, described below.

In one embodiment, the tape copying module 104 mounts a first source tape of multiple source tapes on a source tape drive. The tape copying module 104 mounts a destination tape on a destination tape drive. The tape copying module 104 may copy a first index of an index partition of the first source tape to a first copied index of an index partition of the destination tape. The tape copying module 104 stores first position information corresponding to the first copied index on the destination tape. The tape copying module 104 may copy first data of a data partition of the first source tape to a first copied data of a data partition of the destination tape. The tape copying module 104 stores second position information corresponding to the first copied data on the destination tape. In this manner, the tape copying module 104 may facilitate efficient transfer of data from a tape with a smaller capacity to a tape with a larger capacity. Ultimately, this may facilitate providing faster migration from one generation of tape to another and/or reduced resource usage (e.g., time, processor, memory, data bandwidth, etc.).

As may be appreciated, the tape copying module 104 may be used in any suitable data replication system 100. In certain embodiments, as described below with reference to FIGS. 2 and 3, the tape copying module 104 includes multiple modules that perform the operations of the tape copying module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
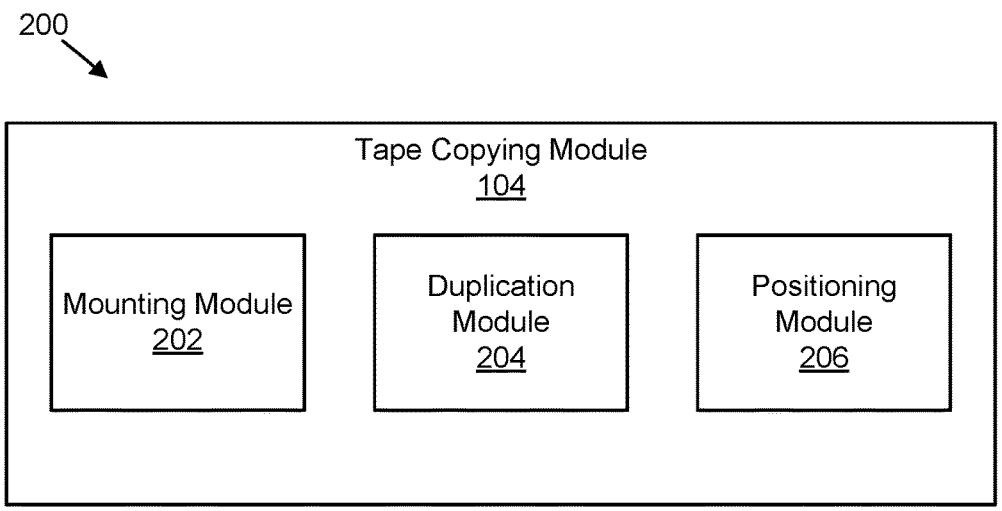
FIG. 2 is a schematic block diagram illustrating one embodiment of a module for tape copying in accordance with one embodiment of the present invention.

FIG. 2 is a schematic block diagram illustrating one embodiment of a module 200 for tape copying. In one embodiment, the module 200 includes an embodiment of a tape copying module 104. The tape copying module 104, in various embodiments, includes one or more of a mounting module 202, a duplication module 204, and a positioning module 206, which are described in more detail below.

In one embodiment, the mounting module 202 mounts any tapes that are used for tape copying. Mounting may include loading the tape and positioning the tape for reading and/or writing (e.g., making the tape available for use). In certain embodiments, the mounting module 202 mounts a first source tape of multiple source tapes (e.g., tapes to be copied from) on a source tape drive (e.g., drive to be copied from). In various embodiments, the mounting module 202 mounts a destination tape (e.g., tape to be copied to) on a destination tape drive (e.g., drive to be copied to). In some embodiments, the mounting module 202 mounts a second source tape of the multiple source tapes on the source tape drive. In one embodiment, the mounting module 202 may consecutively mount each source tape of the multiple source tapes to facilitate copying data from all of the source tapes to a single destination tape.

The duplication module 204, in one embodiment, copies indexes and/or data from one tape to another. In one embodiment, the duplication module 204 copies a first index of an index partition of a first source tape to a first copied index of an index partition of a destination tape. In another embodiment, the duplication module 204 copies first data of a data partition of the first source tape to a first copied data of a data partition of the destination tape. In certain embodiments, the duplication module 204 copies a second index of an index partition of a second source tape to a second copied index of the index partition of the destination tape. In various embodiments, the duplication module 204 copies second data of a data partition of the second source tape to a second copied data of the data partition of the destination tape. The duplication module 204 may copy indexes and/or data without making any changes from the source tape to the destination tape.

For example, the duplication module 204 may copy the first index of the index partition of the first source tape to the first copied index of the index partition of the destination tape while maintaining a form of the index partition of the first source tape in the first copied index.

As another example, the duplication module 204 may copy the first data of the data partition of the first source tape to the first copied data of the data partition of the destination tape while maintaining a form of the first data of the first source tape in the first copied data. Maintaining a form may mean that the information is exactly the same on the source tape and the destination tape and/or that the information is 90-100% the same on the source tape and the destination tape. In some embodiments, the duplication module 204 duplicates indexes and/or data from multiple source tapes onto one destination tape.

The positioning module 206, in one embodiment, stores position information corresponding to information that is copied from a source tape to a destination tape. For example, in one embodiment, the positioning module 206 stores first position information corresponding to a first copied index on a destination tape. As another example, in one embodiment, the positioning module 206 stores second position information corresponding to first copied data on a destination tape. In certain embodiments, the positioning module 206 stores third position information corresponding to a second copied index on a destination tape. In various embodiments, the positioning module 206 stores fourth position information corresponding to second copied data on a destination tape. In certain embodiments, the positioning module 206 stores position information from multiple source tapes onto one destination tape.

In some embodiments, an index partition of a source tape includes a first data storage region having a first index, and an index partition of a destination tape includes a second data storage region having a first copied index. In such embodiments, the duplication module 204 may copy third data of the first data storage region to third copied data in the second data storage region. In some embodiments, a file mark separates the third data and the first index in the first data storage region. In other embodiments, a file mark does not separate the third copied data and the first copied index in the second data storage region.

In some embodiments, a capacity of the destination tape is larger than a capacity of the source tape. In such embodiments, the destination tape may have a capacity to hold information from multiple source tapes. For example, in one embodiment, a destination tape may have a capacity 2, 4, 6, 8, 10, or 100 times the capacity of the source tape. In certain embodiments, the source tape is an older generation tape relative to the destination tape. For example, the source tape may be a first generation tape while the destination tape may be a second generation tape.

In certain embodiments, at least a portion of the mounting module 202, the duplication module 204, and the positioning module 206 include one or more of hardware and executable code. In such embodiments, the executable code may be stored on one or more computer readable storage media.

Figure 3:
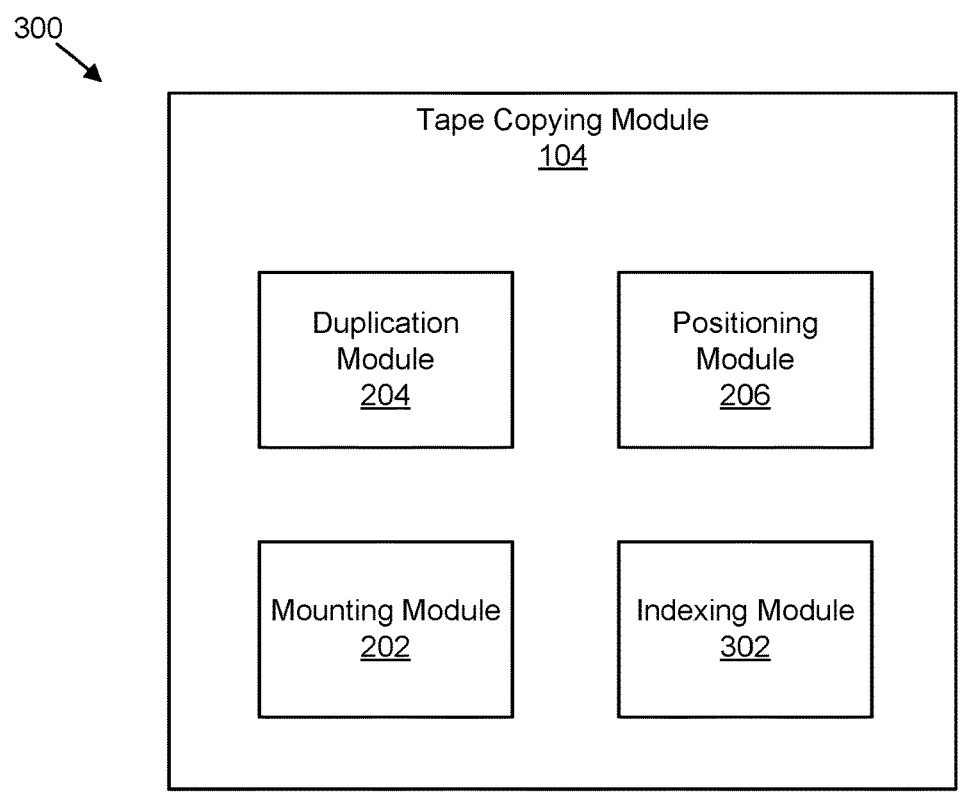
FIG. 3 is a schematic block diagram illustrating one embodiment of another module for tape copying in accordance with one embodiment of the present invention.

FIG. 3 is a schematic block diagram illustrating one embodiment of another module 300 for tape copying. In one embodiment, the module 300 includes an embodiment of a tape copying module 104. The tape copying module 104, in various embodiments, includes one or more of a mounting module 202, a duplication module 204, and a positioning module 206, which may be substantially similar to the mounting module 202, the duplication module 204, and the positioning module 206 described above. The tape copying module 104 may also include an indexing module 302, which is described in more detail below.

In one embodiment, the indexing module 302 determines a composite index on the destination tape from the indexes copied to the destination tape from the source tapes. For example, in one embodiment, the indexing module 302 reads a first copied index using first position information; reads a second copied index using third position information; and forms a composite index on the destination tape based on the first copied index and the second copied index.

Figure 4:
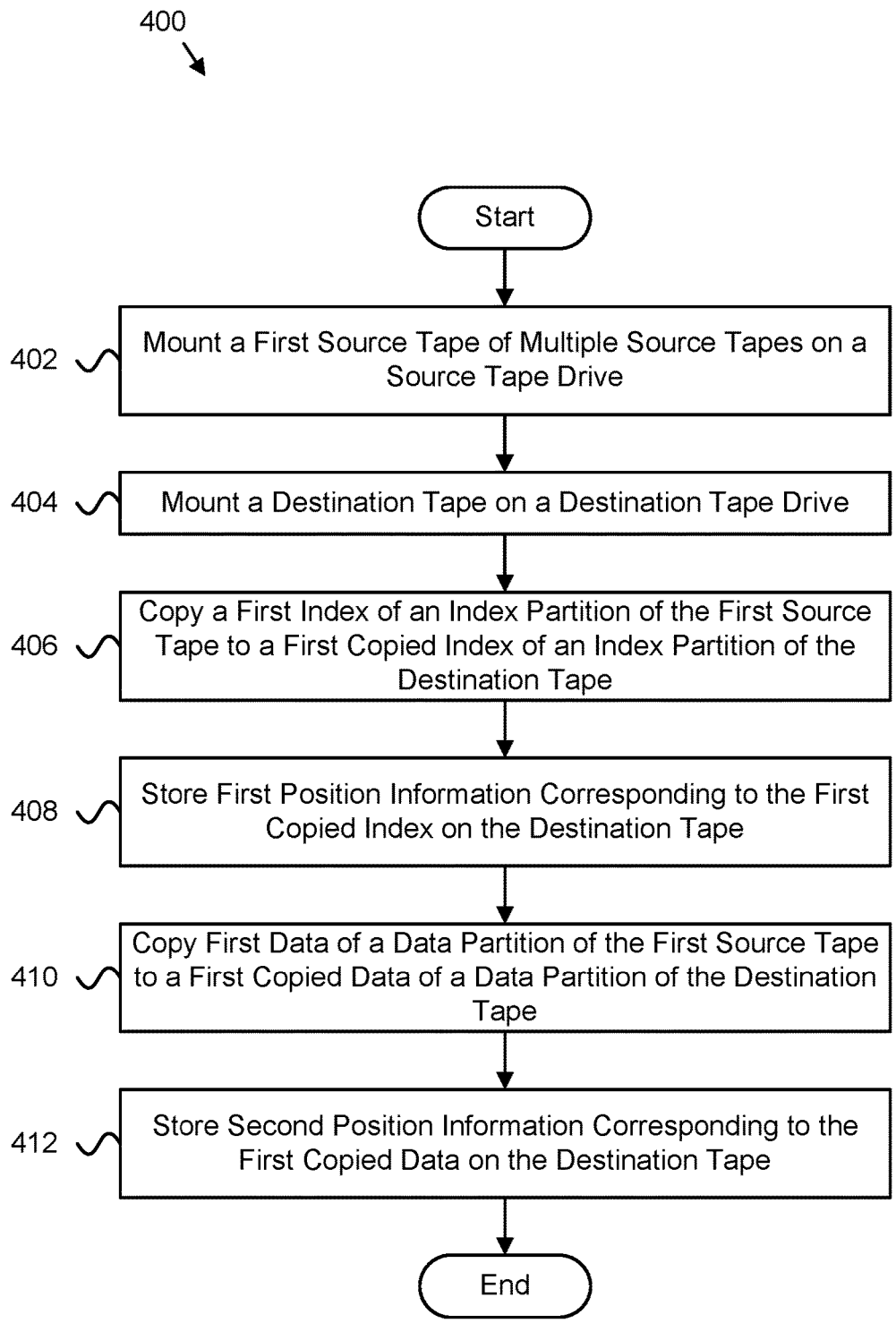
FIG. 4 is a schematic flow chart diagram illustrating one embodiment of a method for tape copying in accordance with one embodiment of the present invention.

FIG. 4 is a schematic flow chart diagram illustrating one embodiment of a method 400 for tape copying. In one embodiment, the method 400 begins and mounts 402 a first source tape of multiple source tapes on a source tape drive. In some embodiments, the method 400 mounts 404 a destination tape on a destination tape drive. The method 400 also copies 406 a first index of an index partition of the first source tape to a first copied index of an index partition of the destination tape. In one embodiment, copying 406 the first index of the index partition of the first source tape to the first copied index of the index partition of the destination tape includes maintaining a form of the index partition of the first source tape in the first copied index.

In some embodiments, the method 400 stores 408 first position information corresponding to the first copied index on the destination tape. In various embodiments, the method 400 copies 410 first data of a data partition of the first source tape to a first copied data of a data partition of the destination tape. In one embodiment, copying 410 the first data of the data partition of the first source tape to the first copied data of the data partition of the destination tape includes maintaining a form of the first data of the first source tape in the first copied data. In certain embodiments, the method 400 stores 412 second position information corresponding to the first copied data on the destination tape, and the method 400 ends.

In various embodiments, the index partition of the first source tape includes a first data storage region having the first index, and the index partition of the destination tape includes a second data storage region having the first copied index. In such embodiments, the method 400 may copy third data of the first data storage region to third copied data in the second data storage region. In some embodiments, a file mark separates the third data and the first index in the first data storage region. In various embodiments, a file mark does not separate the third copied data and the first copied index in the second data storage region.

In certain embodiments, a capacity of the destination tape is larger than a capacity of each tape of the plurality of source tapes. In some embodiments, the first source tape is an older generation tape relative to the destination tape (e.g., the destination tape is a newer generation than the first source tape).

Figure 5:
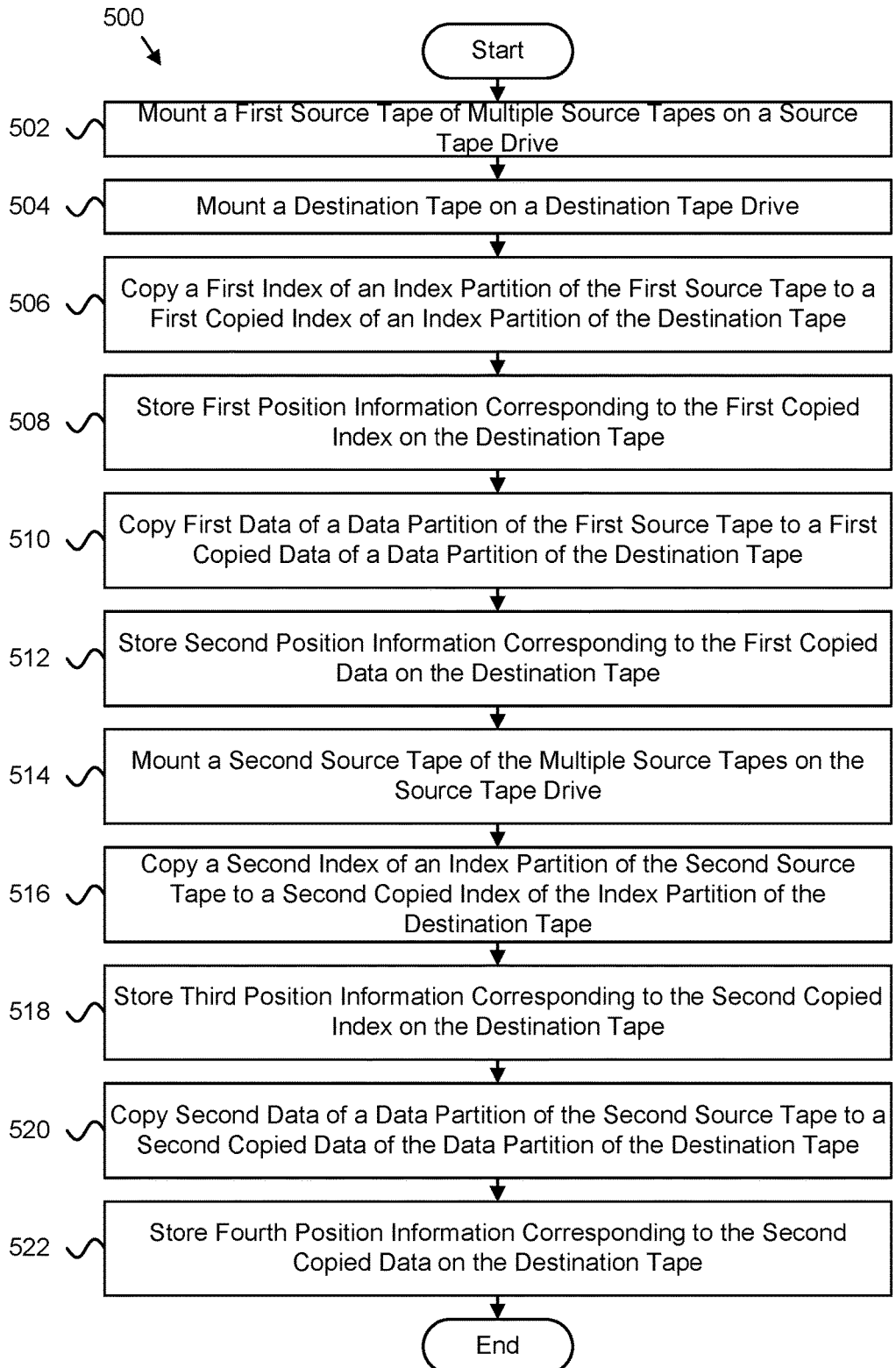
FIG. 5 is a schematic flow chart diagram illustrating another embodiment of a method for tape copying in accordance with one embodiment of the present invention.

FIG. 5 is a schematic flow chart diagram illustrating another embodiment of a method 500 for tape copying. In one embodiment, the method 500 begins and mounts 502 a first source tape of multiple source tapes on a source tape drive. In some embodiments, the method 500 mounts 504 a destination tape on a destination tape drive. The method 500 also copies 506 a first index of an index partition of the first source tape to a first copied index of an index partition of the destination tape. In one embodiment, copying 506 the first index of the index partition of the first source tape to the first copied index of the index partition of the destination tape includes maintaining a form of the index partition of the first source tape in the first copied index.

In some embodiments, the method 500 stores 508 first position information corresponding to the first copied index on the destination tape. In various embodiments, the method 500 copies 510 first data of a data partition of the first source tape to a first copied data of a data partition of the destination tape. In one embodiment, copying 510 the first data of the data partition of the first source tape to the first copied data of the data partition of the destination tape includes maintaining a form of the first data of the first source tape in the first copied data. In certain embodiments, the method 500 stores 512 second position information corresponding to the first copied data on the destination tape.

In various embodiments, the method 500 mounts 514 a second source tape of the multiple source tapes on the source tape drive. The method 500 also copies 516 a second index of an index partition of the second source tape to a second copied index of the index partition of the destination tape. In one embodiment, copying 516 the second index of the index partition of the second source tape to the second copied index of the index partition of the destination tape includes maintaining a form of the index partition of the second source tape in the second copied index.

In some embodiments, the method 500 stores 518 third position information corresponding to the second copied index on the destination tape. In various embodiments, the method 500 copies 520 second data of a data partition of the second source tape to a second copied data of the data partition of the destination tape. In one embodiment, copying 520 the second data of the data partition of the second source tape to the second copied data of the data partition of the destination tape includes maintaining a form of the second data of the second source tape in the second copied data. In certain embodiments, the method 500 stores 522 fourth position information corresponding to the second copied data on the destination tape, and the method 500 ends. In some embodiments, the method 500 reads the first copied index using the first position information, reads the second copied index using the third position information, and forms a composite index on the destination tape based on the first copied index and the second copied index.

In various embodiments, the index partition of the first source tape includes a first data storage region having the first index, and the index partition of the destination tape includes a second data storage region having the first copied index. In such embodiments, the method 500 may copy third data of the first data storage region to third copied data in the second data storage region. In some embodiments, a file mark separates the third data and the first index in the first data storage region. In various embodiments, a file mark does not separate the third copied data and the first copied index in the second data storage region.

In certain embodiments, a capacity of the destination tape is larger than a capacity of each tape of the plurality of source tapes. In some embodiments, the first source tape is an older generation tape relative to the destination tape (e.g., the destination tape is a newer generation than the first source tape).

Figure 6:
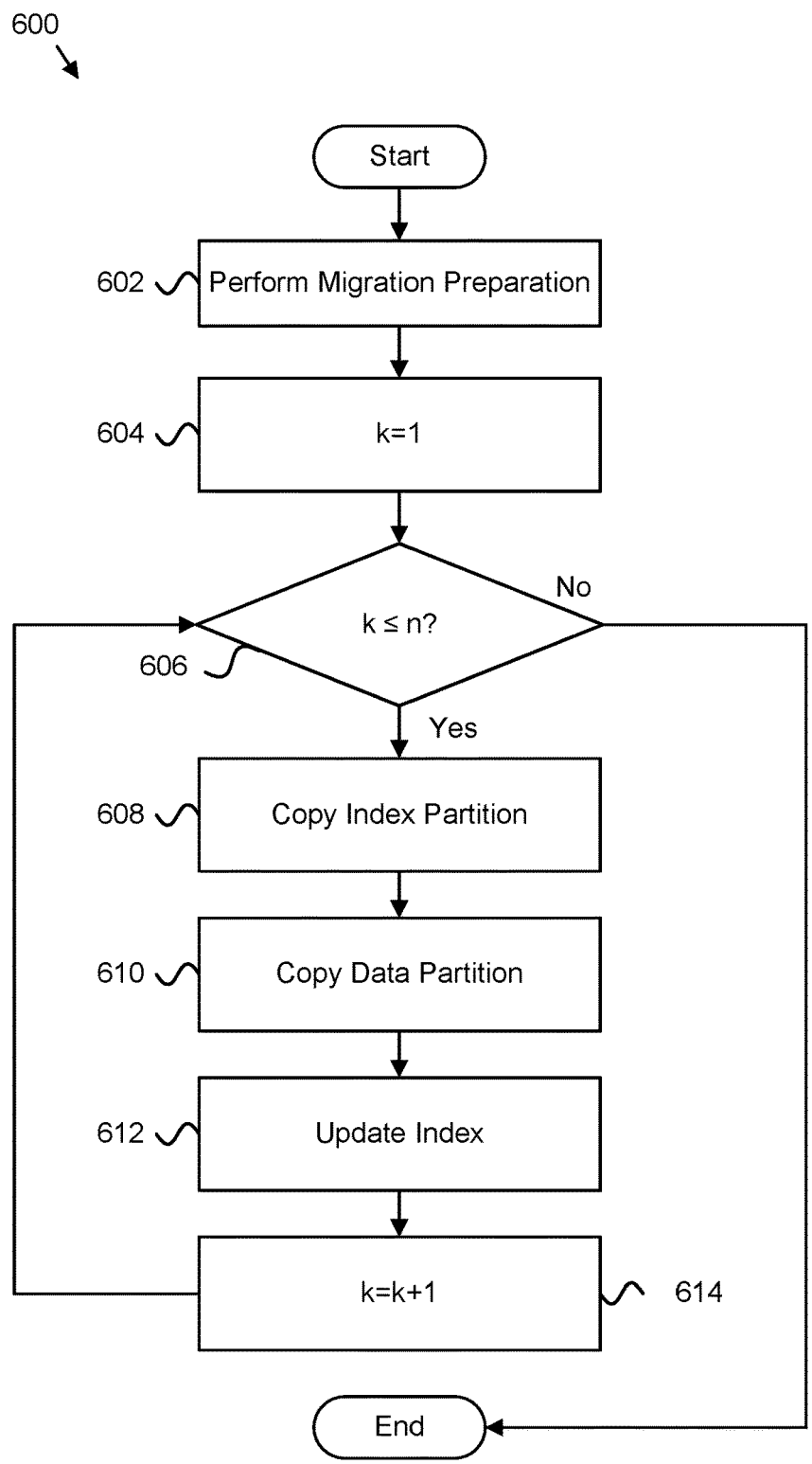
FIG. 6 is a schematic flow chart diagram illustrating a further embodiment of a method for tape copying in accordance with one embodiment of the present invention.

FIG. 6 is a schematic flow chart diagram illustrating a further embodiment of a method 600 for tape copying. The method 600 starts and performs 602 migration preparation. The migration preparation may include formatting a destination tape. In one embodiment, the migration preparation may include performing a linear tape file system ("LTFS") formatting on a destination tape that is a new-generation tape compared to a source tape that is an old-generation tape. An old-generation tape may be a previous generation tape to the new-generation tape. The migration preparation may also include storing an empty index file on a server and/or unmounting a LTFS. In some embodiments, the migration preparation includes mounting a first source tape on a first tape drive and mounting a destination tape on a destination tape drive. The method 600 includes setting 604 k=1. k represents a current source tape to be copied out of n number of tapes to be copied. n represents the number of source tapes to be copied.

The method 600 determines 606 whether k≤n. If the method 600 determines 606 that k is not ≤n, the method 600 ends. If the method 600 determines 606 that k is ≤n, the method 600 copies 608 the index partition of the source tape k to the destination tape. Copying 608 the index partition may include: moving to a file mark ("FM") position next to an LTFS Label in an index partition of the source tape k; moving to the second FM position behind the end of data ("EOD") in the index partition of the destination tape and recording a record number; performing a copy up to (and not including) the next FM (e.g., data recorded by rules of the tape k) by extended copy (e.g., extended copy may read from the source tape and directly write to the destination tape) and recording a record number of the destination tape; and performing a copy up to and including the FM next to the index by extended copy (e.g., the index file of the tape k) without creating an FM in front of the index in the destination tape and recording a record number of the destination tape. The FM may not be created in the destination tape because the index of the source tape k is written in the rules region of the destination tape.

The method 600 copies 610 the data partition of the source tape k to the destination tape. Copying 610 the data partition may include: moving to the FM position next to the LTFS Label in a data partition of the source tape k; moving to the EOD of the data partition of the copy destination tape, and move back to an FM so that the current position is at the FM next to the last Index and recording a record number; and performing a copy up to (and including) the last FM (before the EOD) of the source tape k by extended copy and recording the record number of the destination tape.

The method 600 updates 612 the index of the destination tape. Updating 612 the index may include: creating an entry for a volume name of the source tape k in the index on the server; storing each record number having been recorded as an element under the entry of the volume name; moving to the second FM next to the LTFS Label in the index partition of the destination tape and writing the updated index and FM; and updating the index on the server. The method 600 increments 614 k by performing k=k+1, then the method returns to determining 606 whether k≤n.

Figure 7:
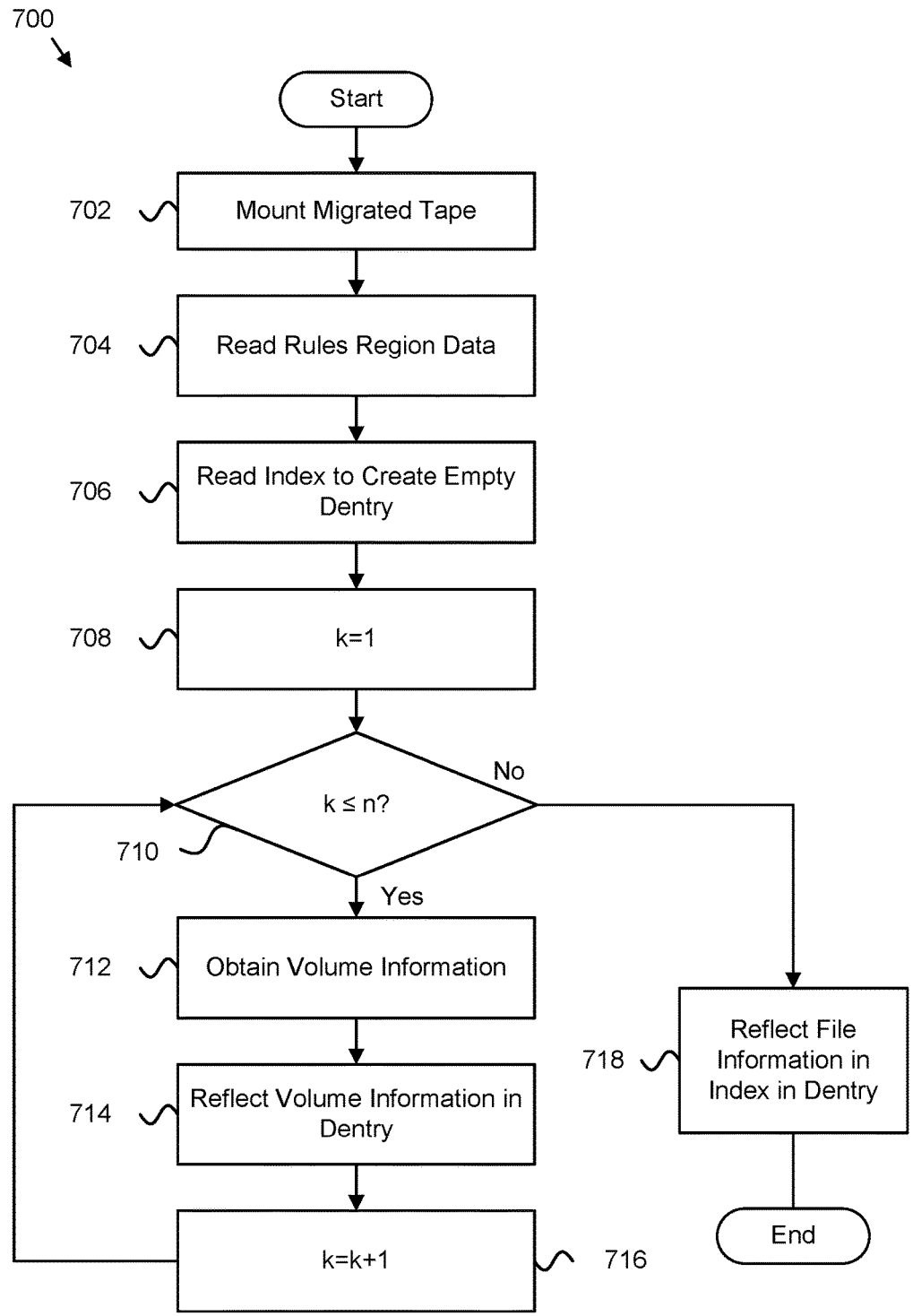
FIG. 7 is a schematic flow chart diagram illustrating one embodiment of a method for reading a tape after tape copying in accordance with one embodiment of the present invention.

FIG. 7 is a schematic flow chart diagram illustrating one embodiment of a method 700 for reading a tape after tape copying. The method 700 begins and mounts 702 a migrated tape (e.g., a destination tape). Mounting 702 the migrated tape may include: loading the migrated tape and reading the migrated tape up to and including the second FM; and processing the VOL 1 Label and the LTFS Label in a conventional manner.

The method 700 reads 704 the rules region data. Reading 704 the rules region data may include: reading data up to the next FM per block and repeatedly storing the data per block as a file for the number of blocks. The block number may be included in the file name for distinction in making an access (e.g., XXX_004.dat, XXX_005.dat, etc.).

The method 700 reads 706 the index to create an empty dentry (e.g., file organizational structure). The method 700 sets 708 k=1. k represents a current volume on the migrated tape out of n volumes. n represents the number of volumes on the migrated tape. The method 700 determines 710 whether k≤n. If the method 700 determines 710 that k is ≤n, the method 700 obtains 712 the volume k name, partition, start block and size (e.g., number of blocks) of each of the rules file data, index file, and the data file on the migrated tape based on the index.

The method 700 reflects 714 the volume information in the dentry. For example, the method 700 uses the volume information to access the index of the volume k and updates the dentry with information from the index. The method 700 then returns to determining 710 whether k≤n. If the method 700 determines 710 that k is not ≤n, the method 700 reflects the file information from all of the volumes in the dentry, and the method 700 ends.

In certain embodiments, the index of a migrated tape may be updated after source tapes are copied to the migrated tape to inhibit special mounting procedures for the migrated tape.

Figure 8:
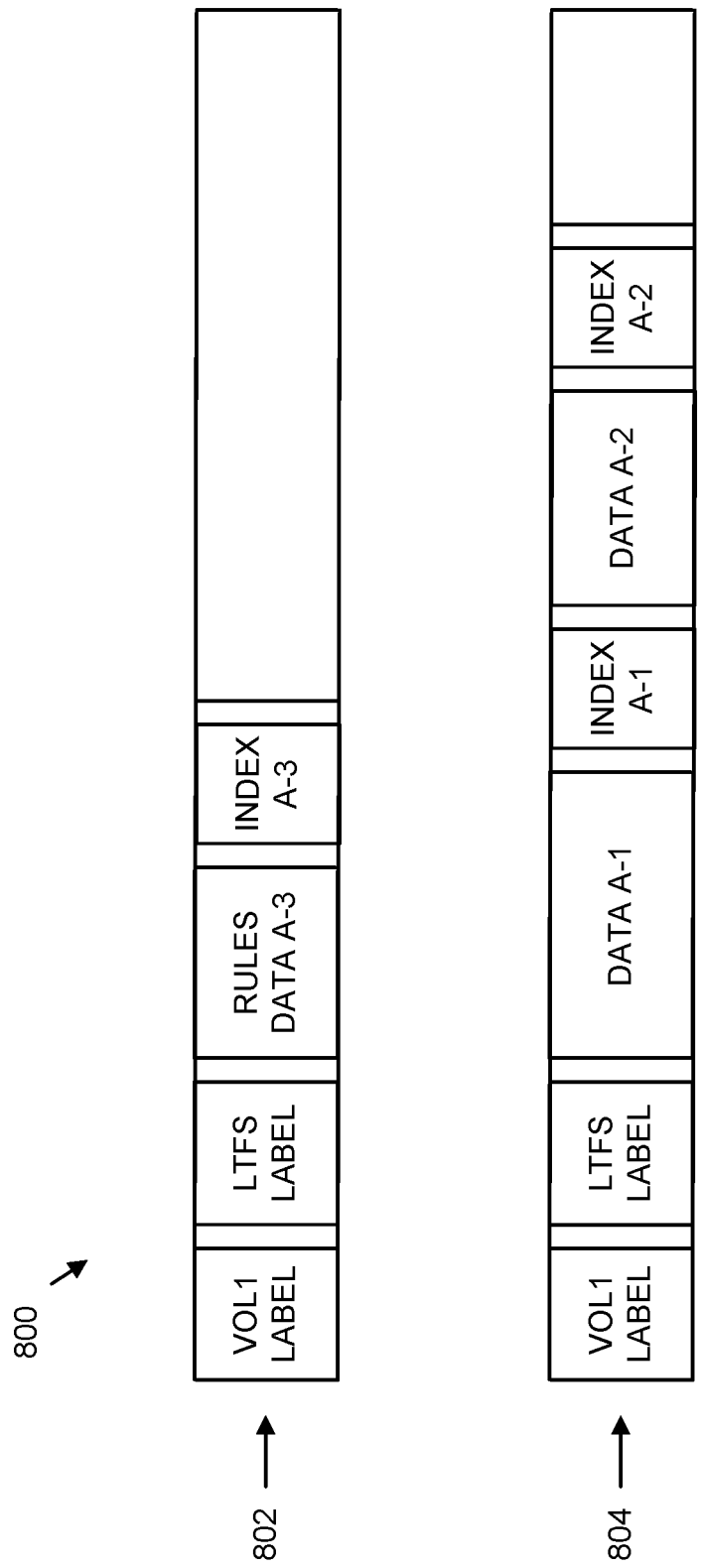
FIG. 8 is a schematic block diagram illustrating one embodiment of a data storage configuration for a first source tape in accordance with one embodiment of the present invention.

FIG. 8 is a schematic block diagram illustrating one embodiment of a data storage configuration 800 for a first source tape having a volume name A. The first source tape is an old generation tape. The data storage configuration 800 of the first source tape includes an index partition 802 having in sequential order: a VOL1 label, a first FM, an LTFS label, a second FM, rules data A-3 (e.g., data in the rules region), a third FM, an index A-3, and a fourth FM. The data storage configuration 800 of the first source tape also includes a data partition 804 having in sequential order: a VOL1 label, a first FM, an LTFS label, a second FM, data A-1, a third FM, an index A-1, a fourth FM, data A-2, a fifth FM, an index A-2, and a sixth FM.

Figure 9:
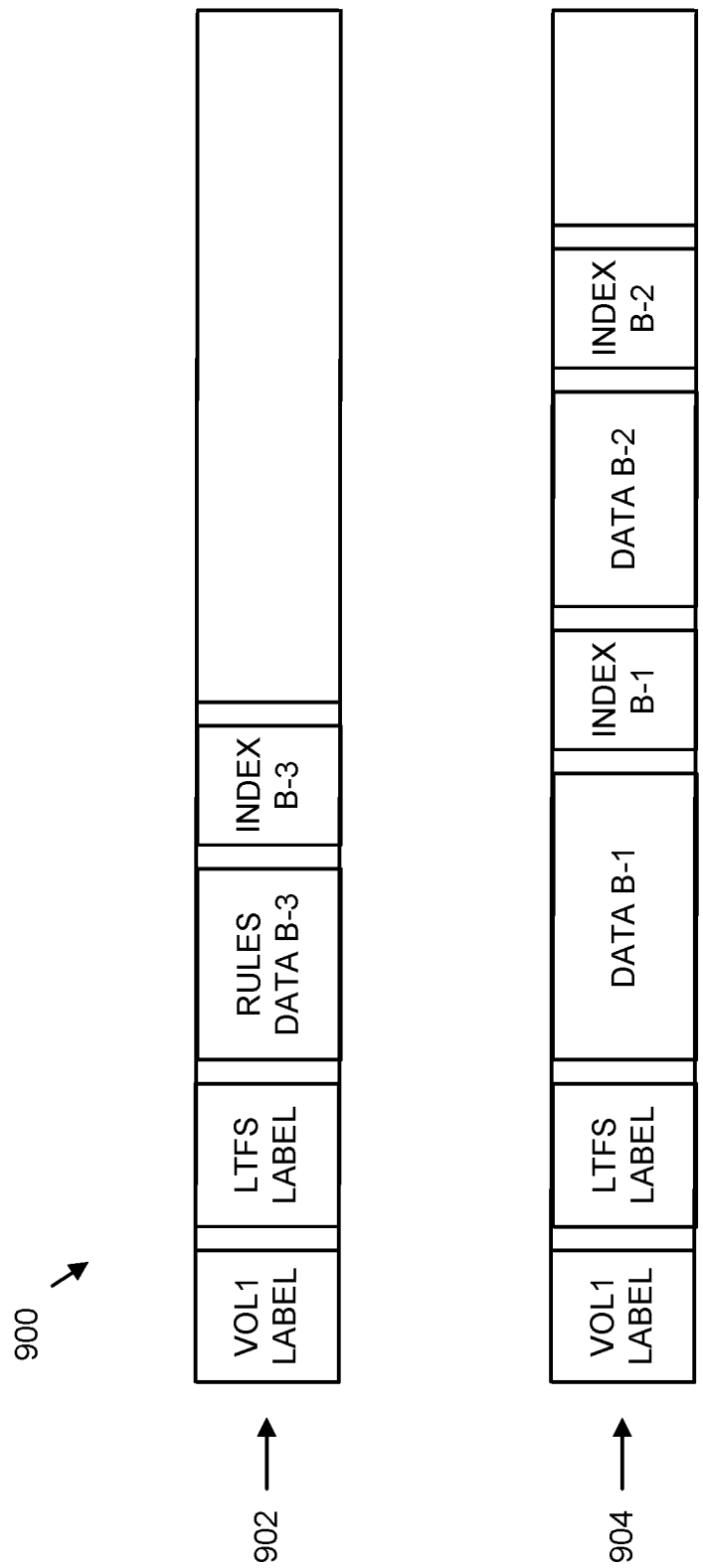
FIG. 9 is a schematic block diagram illustrating one embodiment of a data storage configuration for a second source tape in accordance with one embodiment of the present invention.

FIG. 9 is a schematic block diagram illustrating one embodiment of a data storage configuration 900 for a second source tape having a volume name B. The second source tape is an old generation tape. The data storage configuration 900 of the second source tape includes an index partition 902 having in sequential order: a VOL1 label, a first FM, an LTFS label, a second FM, rules data B-3 (e.g., data in the rules region), a third FM, an index B-3, and a fourth FM. The data storage configuration 900 of the second source tape also includes a data partition 904 having in sequential order: a VOL1 label, a first FM, an LTFS label, a second FM, data B-1, a third FM, an index B-1, a fourth FM, data B-2, a fifth FM, an index B-2, and a sixth FM.

Figure 10:
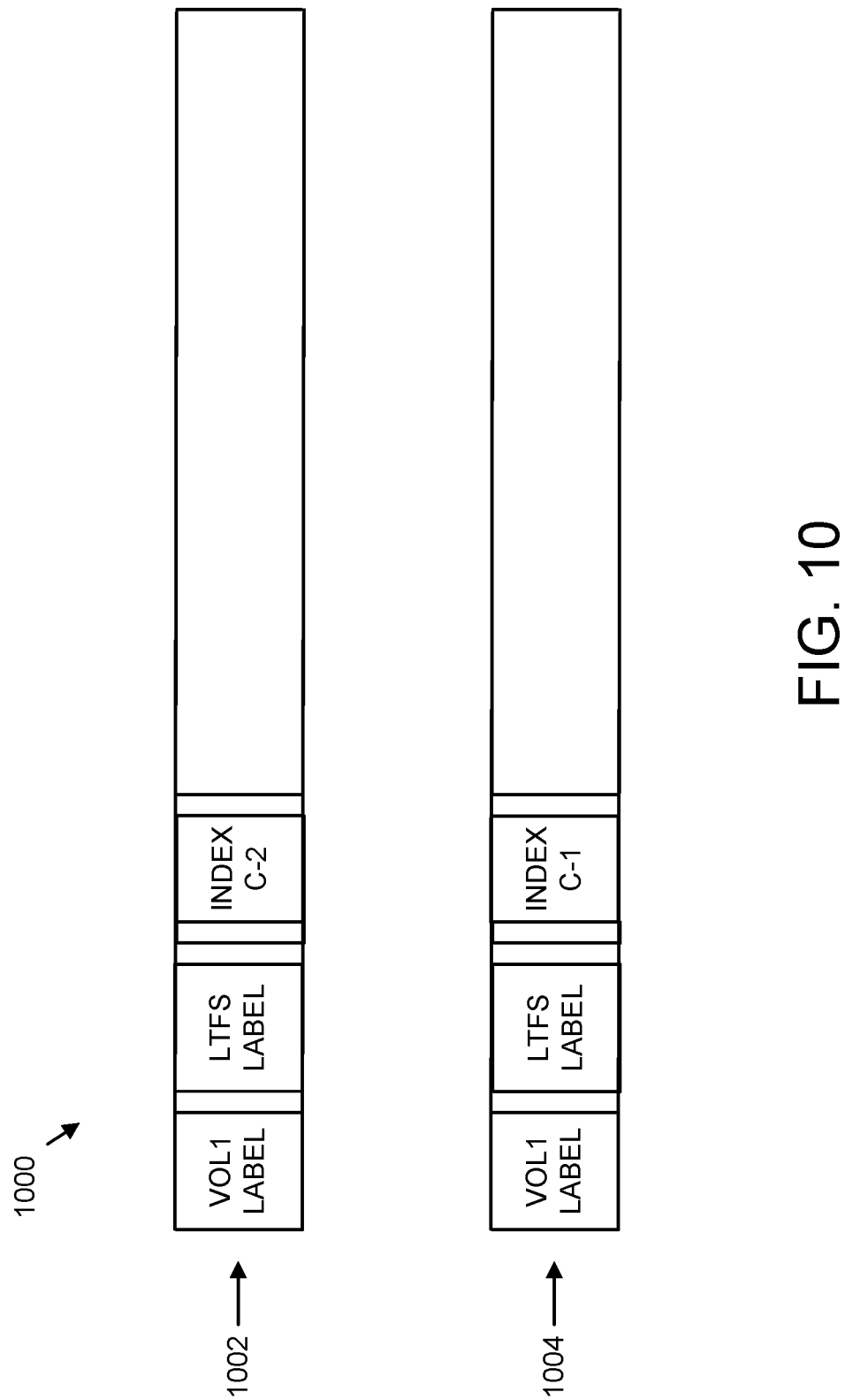
FIG. 10 is a schematic block diagram illustrating one embodiment of a data storage configuration for a destination tape in accordance with one embodiment of the present invention.

FIG. 10 is a schematic block diagram illustrating one embodiment of a data storage configuration 1000 for a destination tape having a volume name C. The destination tape is a new generation tape that is a newer generation than the first and second source tapes of FIGS. 8 and 9. The data storage configuration 1000 of the destination tape includes an index partition 1002 having in sequential order: a VOL1 label, a first FM, an LTFS label, a second FM, a third FM, an index C-2, and a fourth FM. The data storage configuration 1000 of the destination tape also includes a data partition 1004 having in sequential order: a VOL1 label, a first FM, an LTFS label, a second FM, a third FM, an index C-1, and a fourth FM.

Figure 11:
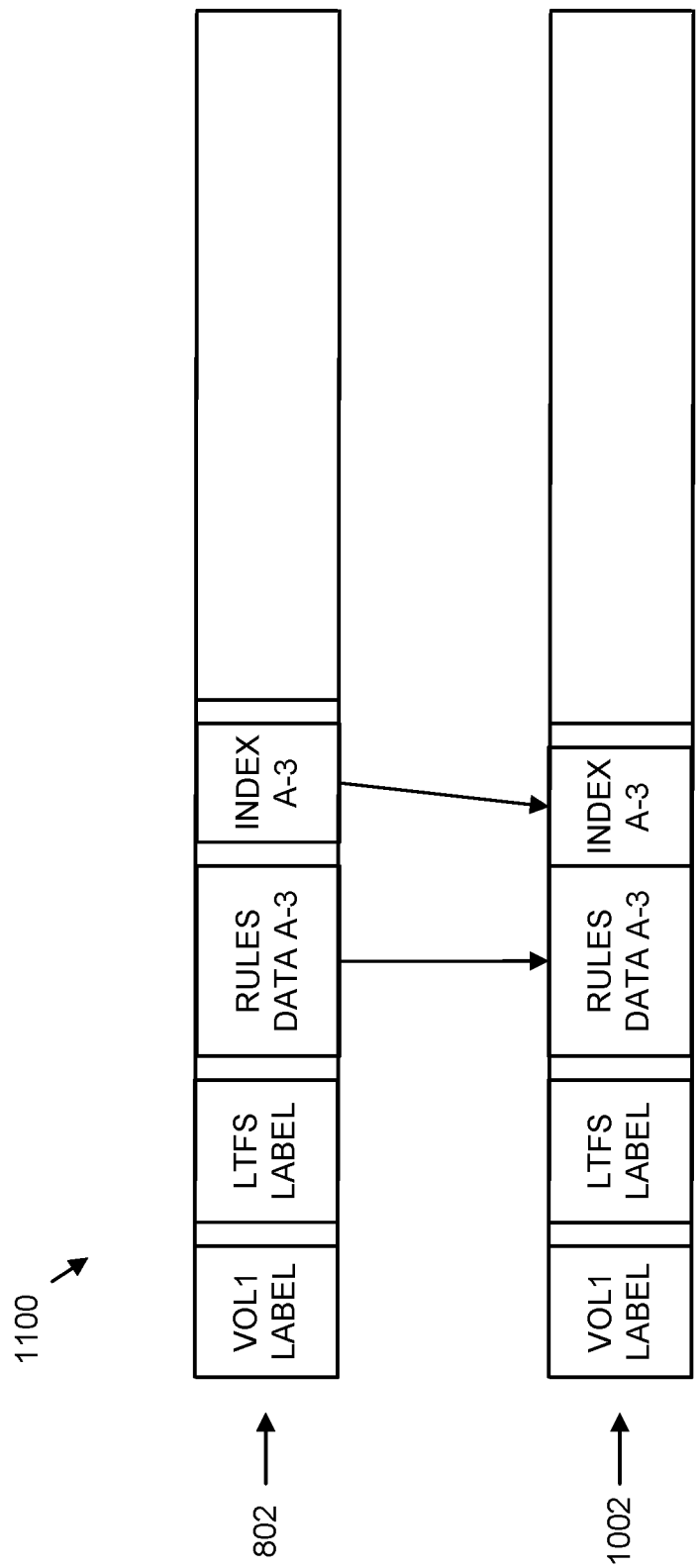
FIG. 11 is a schematic block diagram illustrating one embodiment of a first copying operation in accordance with one embodiment of the present invention.

FIG. 11 is a schematic block diagram illustrating one embodiment of a first copying operation 1100. In the first copying operation 1100: the destination tape is loaded into a destination drive and LTFS formatting is applied to the destination tape; an index (e.g., in extensible markup language ("XML") format) is stored in a server and LTFS is unmounted; the first source tape is selected and loaded into a source tape drive for copying the first source tape to the destination tape (LTFS is not mounted for the first source tape); a position of the first source tape is moved to the second FM following the LTFS label in the index partition 802; a position of the destination tape is moved to the third FM following the second FM and the LTFS label (e.g., end of data ("EOD")) in the index partition 1002 and a record number (e.g., RI1) is recorded; the rules data A-3 of the index partition 802 (e.g., the index partition 802 from the end of the second FM up to the beginning of the third FM (not including the second FM or the third FM)) is copied to the index partition 1002 (e.g., positioned after the second FM of the index partition 1002 of the destination tape) by extended copy as illustrated and a record number (e.g., RI2) of the destination tape is recorded; and the index A-3 and the fourth FM of the index partition 802 (e.g., the index partition 802 from the end of the third FM up to and including the fourth FM) are copied to the index partition 1002 (e.g., positioned after the rules data A-3 of the index partition 1002 of the destination tape without an FM between the rules data A-3 and the index A-3) by extended copy as illustrated and a record number (e.g., RI3) of the destination tape is recorded.

Figure 12:
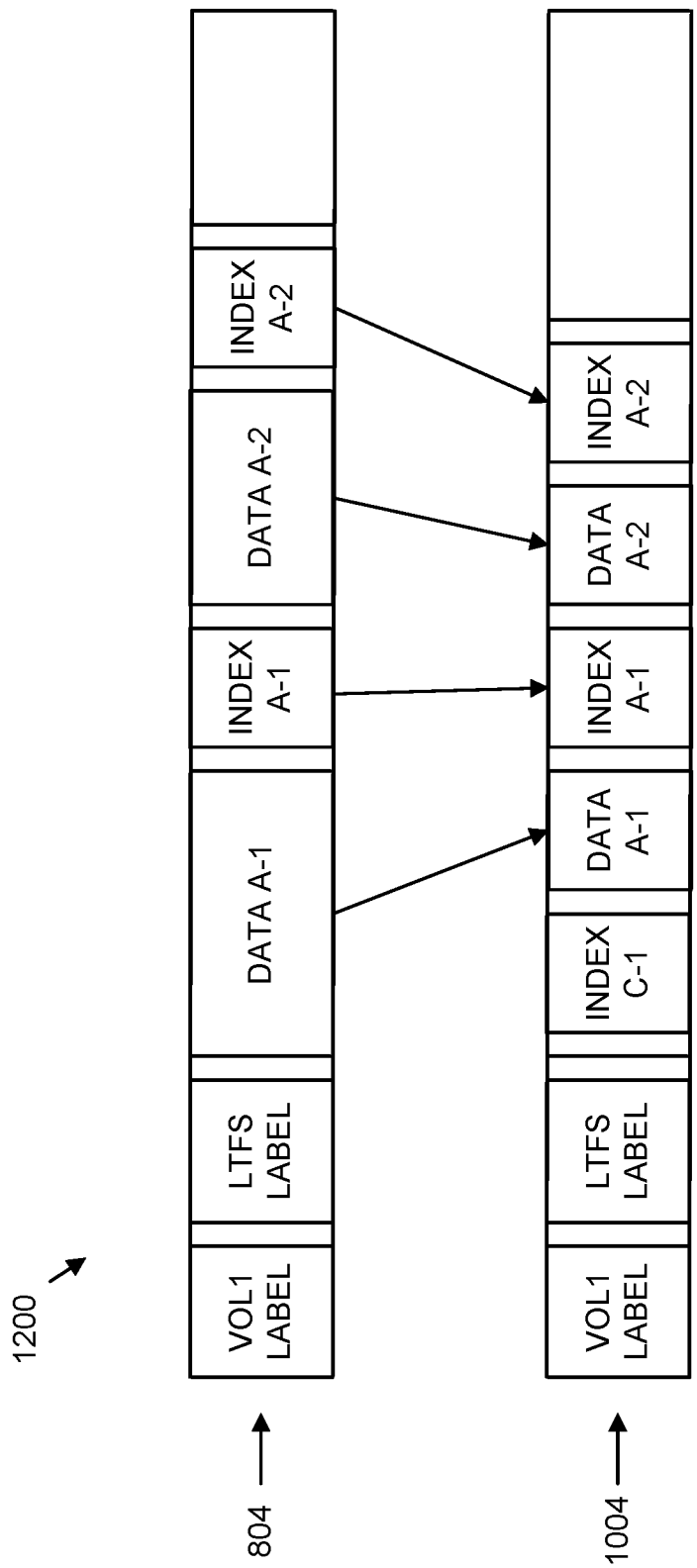
FIG. 12 is a schematic block diagram illustrating one embodiment of a second copying operation in accordance with one embodiment of the present invention.

FIG. 12 is a schematic block diagram illustrating one embodiment of a second copying operation 1200. In the second copying operation 1200: a position of the first source tape is moved to the second FM following the LTFS label in the data partition 804; a position of the destination tape is moved to the end of the fourth FM following the index C-1 (e.g., EOD) in the data partition 1004 and a record number (e.g., RD1) is recorded; and the data A-1, the third FM, the index A-1, the fourth FM, the data A-2, the fifth FM, the index A-2, and the sixth FM of the data partition 804 (e.g., the data partition 804 from the end of the second FM to the end of the sixth FM (not including the second FM, but including the third FM, the fourth FM, the fifth FM, and the sixth FM)) is copied to the data partition 1004 (e.g., positioned after the fourth FM of the data partition 1004 of the destination tape) by extended copy as illustrated and a record number (e.g., RD2) of the destination tape is recorded.

In certain embodiments, an entry for a volume name of the first source tape may be created in the index on the server. Each record number that is recorded corresponding to copying the first source tape may be stored as an element under the entry of the volume name. For example, an XML format example is provided below. In this example, SI12, SI23, and SD12 may be calculated in advance.

```
<migrated volume="A">
  <rules>
    <partition>a</partition>
    <startblock>RI1</startblock>
    <size>SI12</size>
  </rules>
  <index>
    <partition>a</partition>
    <startblock>RI2</startblock>
    <size>SI23<size>
  </index>
  <data>
    <partition>b</partition>
    <startblock>RD1</startblock>
    <size>SD12</size>
  </data>
</migrated>
```

Next, the destination tape may be moved to the third FM (e.g., the FM after index A-3) in the index partition 1002 and an updated index C-2 and a fourth FM may be written. The updated index C-2 may be based on the index formatted and appended on the server.

Figure 13:
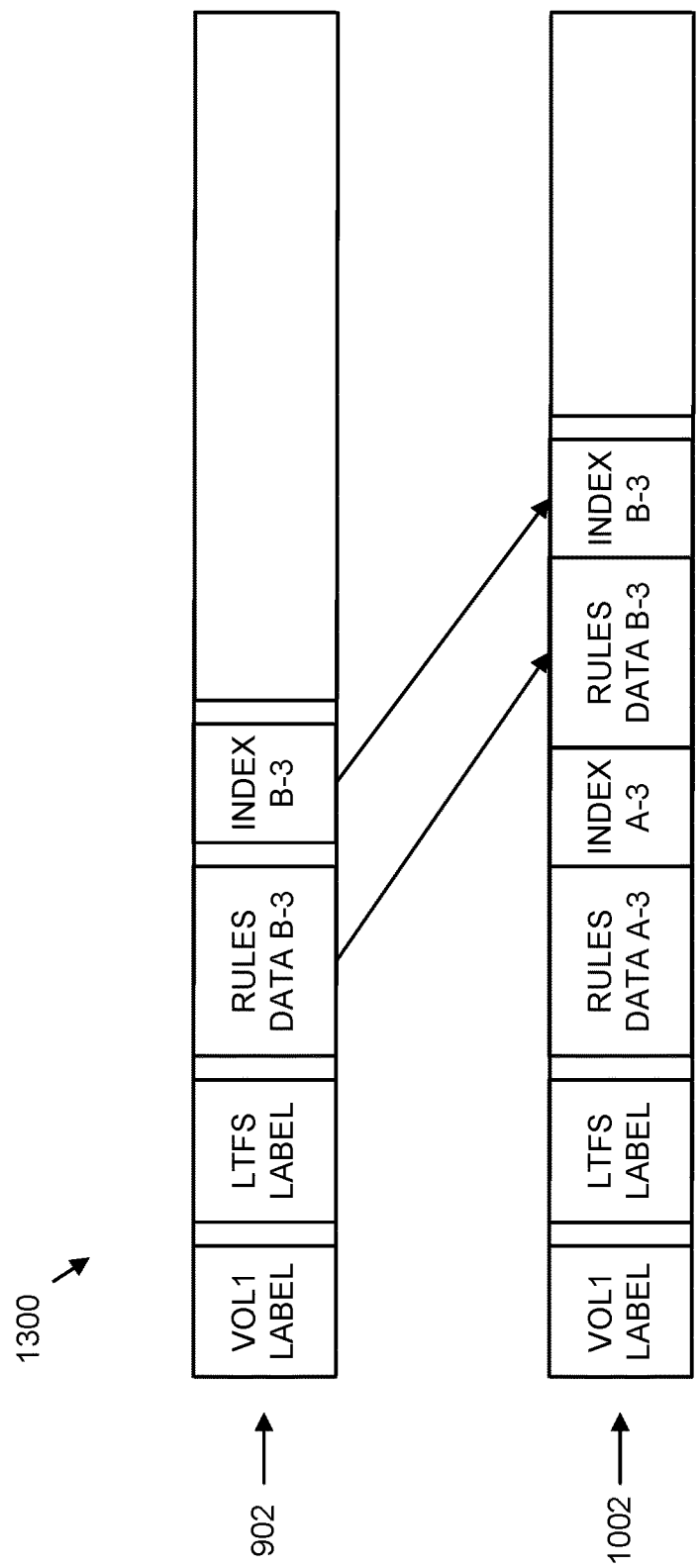
FIG. 13 is a schematic block diagram illustrating one embodiment of a third copying operation in accordance with one embodiment of the present invention.

FIG. 13 is a schematic block diagram illustrating one embodiment of a third copying operation 1300. In the third copying operation 1300: the second source tape is selected and loaded into the source tape drive for copying the second source tape to the destination tape (LTFS is not mounted for the second source tape); a position of the second source tape is moved to the second FM following the LTFS label in the index partition 902; a position of the destination tape is moved to the third FM following the index A-3 (e.g., EOD) in the index partition 1002 and a record number (e.g., RI3—same as the previous record number RI3) is recorded; the rules data B-3 of the index partition 902 (e.g., the index partition 902 from the end of the second FM up to the beginning of the third FM (not including the second FM or the third FM)) is copied to the index partition 1002 (e.g., positioned after the index A-3 of the index partition 1002 of the destination tape) by extended copy as illustrated and a record number (e.g., RI4) of the destination tape is recorded; and the index B-3 and the fourth FM of the index partition 902 (e.g., the index partition 902 from the end of the third FM up to and including the fourth FM) are copied to the index partition 1002 (e.g., positioned after the rules data B-3 of the index partition 1002 of the destination tape without an FM between the rules data B-3 and the index B-3) by extended copy as illustrated and a record number (e.g., RI5) of the destination tape is recorded.

Figure 14:
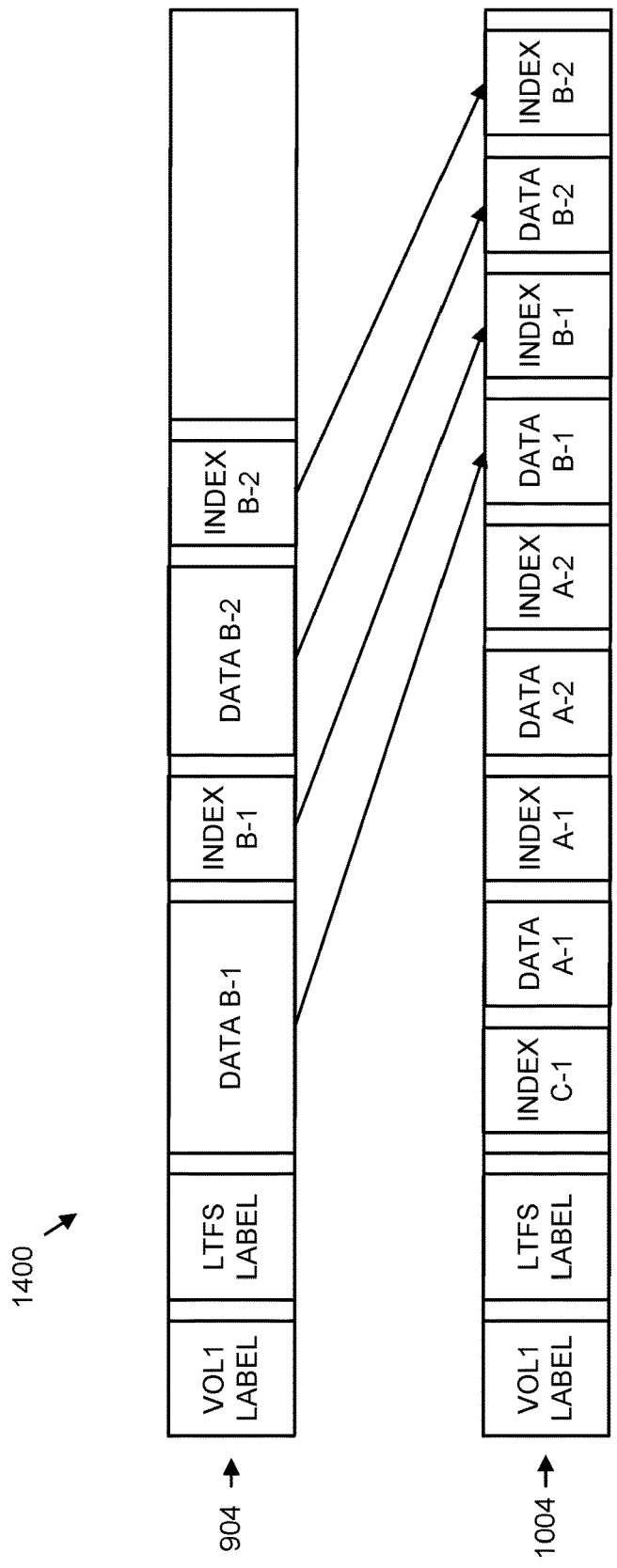
FIG. 14 is a schematic block diagram illustrating one embodiment of a fourth copying operation in accordance with one embodiment of the present invention.

FIG. 14 is a schematic block diagram illustrating one embodiment of a fourth copying operation 1400. In the fourth copying operation 1400: a position of the second source tape is moved to the second FM following the LTFS label in the data partition 904; a position of the destination tape is moved to the end of the eighth FM following the index A-2 in the data partition 1004 and a record number (e.g., RD3) is recorded; and the data B-1, the third FM, the index B-1, the fourth FM, the data B-2, the fifth FM, the index B-2, and the sixth FM of the data partition 904 (e.g., the data partition 904 from the end of the second FM to the end of the sixth FM (not including the second FM, but including the third FM, the fourth FM, the fifth FM, and the sixth FM)) is copied to the data partition 1004 (e.g., positioned after the eighth FM of the data partition 1004 of the destination tape) by extended copy as illustrated and a record number (e.g., RD4) of the destination tape is recorded.

In certain embodiments, an entry for a volume name of the second source tape may be created in the index on the server. Each record number that is recorded corresponding to copying the second source tape may be stored as an element under the entry of the volume name. For example, an XML format example is provided below. In this example, SI34, SI45, and SD34 may be calculated in advance.

```
<migrated volume="A">
  <rules>
    <partition>a</partition>
    <startblock>RI1</startblock>
    <size>SI12</size>
  </rules>
  <index>
    <partition>a</partition>
    <startblock>RI2</startblock>
    <size>SI23<size>
  </index>
  <data>
    <partition>b</partition>
    <startblock>RD1</startblock>
    <size>SD12</size>
  </data>
</migrated>
<migrated volume="B">
  <rules>
    <partition>a</partition>
    <startblock>RI3</startblock>
```

-continued

```
        <size>SI34</size>
    </rules>
    <index>
        <partition>a</partition>
        <startblock>RI4</startblock>
        <size>SI45<size>
    </index>
    <data>
        <partition>b</partition>
        <startblock>RD3</startblock>
        <size>SD34</size>
    </data>
</migrated>
```

Next, the destination tape may be moved to the third FM (e.g., the FM after index B-3) in the index partition 1002 and an updated index C-2 and a fourth FM may be written. The updated index C-2 may be based on the index formatted and appended on the server. In some embodiments, such as in FIG. 15, there may be back pointer chains between the indexes as follows: index C-2 of the index partition 1002 points to index C-1 of the data partition 1004; index A-3 of the index partition 1002 points to index A-2 of the data partition 1004; index A-2 of the data partition 1004 points to index A-1 of the data partition 1004; index B-3 of the index partition 1002 points to index B-2 of the data partition 1004; and index B-2 of the data partition 1004 points to index B-1 of the data partition 1004.

Figure 15:
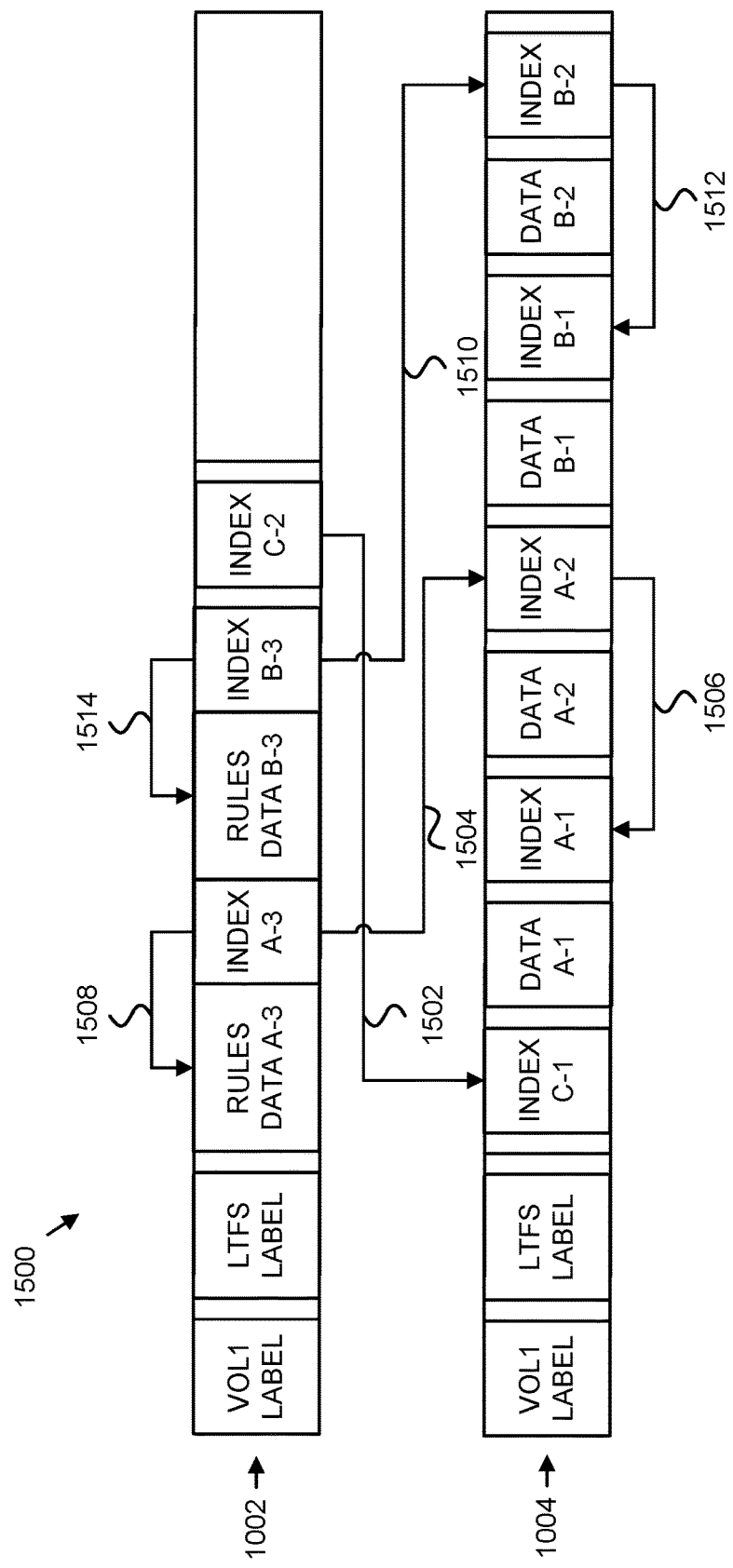
FIG. 15 is a schematic block diagram illustrating one embodiment of an index chain in accordance with one embodiment of the present invention.

FIG. 15 is a schematic block diagram illustrating one embodiment of an index chain 1500. As illustrated, index C-2 (e.g., the LTFS index of the tape C) of the index partition 1002 is chained to index C-1 of the data partition 1004 by a first back pointer 1502.

Index A-3 that was written in the tape A before migration is written in the index partition 1002. The index A-3 of the index partition 1002 is chained to the index A-2 of the data partition 1004 by a second back pointer 1504, and the index A-2 of the data partition 1004 is chained to the index A-1 of the data partition 1004 by a third back pointer 1506. Moreover, the index A-3 of the index partition 1002 is chained to the rules data A-3 of the index partition 1002 by a fourth back pointer 1508.

Index B-3 that was written in the tape B before migration is written in the index partition 1002. The index B-3 of the index partition 1002 is chained to the index B-2 of the data partition 1004 by a fifth back pointer 1510 and the index B-2 of the data partition 1004 is chained to the index B-1 of the data partition 1004 by a sixth back pointer 1512. Moreover, the index B-3 of the index partition 1002 is chained to the rules data B-3 of the index partition 1002 by a seventh back pointer 1514.

However, the second, third, fifth, and sixth back pointers 1504, 1506, 1510, and 1512 written in the indexes in the Tape A and the Tape B may not refer to correct block numbers on the Tape C after migration. Therefore, correction to the back pointers may be performed.

Correction to the back pointers may be performed by: loading a tape and reading up to the second FM; processing the VOL 1 label and the LTFS label in a conventional manner; reading the data up to the next FM and storing the data in separate files per block (e.g., read the following data: rules data A-3, index A-3, rules data B-3, and index B-3 and store each of them in a separate file—the block number may be included in the file name for distinction, such as C_INDEX_004.dat, C_INDEX_005.dat, C_INDEX_006.dat, C_INDEX_007.dat C_INDEX_123.dat, for example); reading the index C-2 to create an empty dentry; checking whether there is a migrated volume based on the read of the index C-2 (the number of volumes may be assumed to be n); setting k=1 to n; obtaining the volume name, partition, start block and size (e.g., the number of blocks) of each of the rules file data, index file and the data file on the destination tape; reading the entry containing information corresponding to the volumes; reading the index file of volume k from the file created previously to reflect it in the dentry; adding the start block of the data file of the volume k to the start block in all the extents in the index C-2 or adding the start block of the data file of the volume k to the start block in the appropriate extent in the index C-2; incrementing k and repeating prior steps for each value of k; reflecting the indexes of the Tape C in the dentry.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a mounting module that mounts a first source tape of a plurality of source tapes on a source tape drive and mounts a destination tape on a destination tape drive;
   a duplication module that copies a first index of an index partition of the first source tape to a first copied index of an index partition of the destination tape and copies first data of a data partition of the first source tape to a first copied data of a data partition of the destination tape; and
   a positioning module that stores first position information corresponding to the first copied index on the destination tape and stores second position information corresponding to the first copied data on the destination tape;
   wherein at least a portion of the mounting module, the duplication module, and the positioning module comprises one or more of hardware and executable code, the executable code being stored on one or more computer readable storage media and wherein:
      the mounting module mounts a second source tape of the plurality of source tapes on the source tape drive;
      the duplication module copies a second index of an index partition of the second source tape to a second copied index of the index partition of the destination tape and copies second data of a data partition of the second source tape to a second copied data of the data partition of the destination tape; and
      the positioning module stores third position information corresponding to the second copied index on the destination tape and stores fourth position information corresponding to the second copied data on the destination tape.

2. The apparatus of claim 1, further comprising an indexing module that:
   reads the first copied index using the first position information;
   reads the second copied index using the third position information; and
   forms a composite index on the destination tape based on the first copied index and the second copied index.

3. The apparatus of claim 1, wherein the index partition of the first source tape comprises a first data storage region having the first index, and the index partition of the destination tape comprises a second data storage region having the first copied index.

4. The apparatus of claim 1, wherein a capacity of the destination tape is larger than a capacity of the first source tape.

5. A method for tape copying, comprising:
mounting a first source tape of a plurality of source tapes on a source tape drive;
mounting a destination tape on a destination tape drive;
copying a first index of an index partition of the first source tape to a first copied index of an index partition of the destination tape;
storing first position information corresponding to the first copied index on the destination tape;
copying first data of a data partition of the first source tape to a first copied data of a data partition of the destination tape;
storing second position information corresponding to the first copied data on the destination tape;
mounting a second source tape of the plurality of source tapes on the source tape drive;
copying a second index of an index partition of the second source tape to a second copied index of the index partition of the destination tape;
storing third position information corresponding to the second copied index on the destination tape;
copying second data of a data partition of the second source tape to a second copied data of the data partition of the destination tape; and
storing fourth position information corresponding to the second copied data on the destination tape.

6. The method of claim 5, further comprising:
reading the first copied index using the first position information;
reading the second copied index using the third position information; and
forming a composite index on the destination tape based on the first copied index and the second copied index.

7. The method of claim 5, wherein copying the first index of the index partition of the first source tape to the first copied index of the index partition of the destination tape comprises maintaining a form of the index partition of the first source tape in the first copied index.

8. The method of claim 5, wherein copying the first data of the data partition of the first source tape to the first copied data of the data partition of the destination tape comprises maintaining a form of the first data of the first source tape in the first copied data.

9. The method of claim 5, wherein the index partition of the first source tape comprises a first data storage region having the first index, and the index partition of the destination tape comprises a second data storage region having the first copied index.

10. The method of claim 9, further comprising copying third data of the first data storage region to third copied data in the second data storage region.

11. The method of claim 10, wherein a file mark separates the third data and the first index in the first data storage region.

12. The method of claim 10, wherein a file mark does not separate the third copied data and the first copied index in the second data storage region.

13. The method of claim 5, wherein a capacity of the destination tape is larger than a capacity of each tape of the plurality of source tapes.

14. The method of claim 5, wherein the first source tape is an older generation tape relative to the destination tape.

15. A computer program product for tape copying, the computer program product comprising a computer readable storage medium having program instructions embodied therewith, the program instructions executable by a processor to cause the processor to:
mount a first source tape of a plurality of source tapes on a source tape drive;
mount a destination tape on a destination tape drive;
copy a first index of an index partition of the first source tape to a first copied index of an index partition of the destination tape;
store first position information corresponding to the first copied index on the destination tape;
copy first data of a data partition of the first source tape to a first copied data of a data partition of the destination tape;
store second position information corresponding to the first copied data on the destination tape;
mount a second source tape of the plurality of source tapes on the source tape drive;
copy a second index of an index partition of the second source tape to a second copied index of the index partition of the destination tape;
store third position information corresponding to the second copied index on the destination tape;
copy second data of a data partition of the second source tape to a second copied data of the data partition of the destination tape; and
store fourth position information corresponding to the second copied data on the destination tape.

16. The computer program product of claim 15, wherein copying the first index of the index partition of the first source tape to the first copied index of the index partition of the destination tape comprises maintaining a form of the index partition of the first source tape in the first copied index.

17. The computer program product of claim 15, wherein copying the first data of the data partition of the first source tape to the first copied data of the data partition of the destination tape comprises maintaining a form of the first data of the first source tape in the first copied data.

* * * * *